US012744487B2

(12) United States Patent
Thongam et al.

(10) Patent No.: US 12,744,487 B2
(45) Date of Patent: Sep. 22, 2026

(54) MOTOR CONTROL BASED ON POWER ELECTRONICS TEMPERATURES

(71) Applicant: FORD GLOBAL TECHNOLOGIES, LLC, Dearborn, MI (US)

(72) Inventors: Jogendra Singh Thongam, Windsor (CA); Baoming Ge, Okemos, MI (US); Fan Wang, Novi, MI (US); Papiya Bagchi, Northville, MI (US); Serdar Hakki Yonak, Ann Arbor, MI (US); Rimma Paransky, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 590 days.

(21) Appl. No.: 18/099,599

(22) Filed: Jan. 20, 2023

(65) Prior Publication Data

US 2024/0250633 A1 Jul. 25, 2024

(51) Int. Cl.
*H02P 29/60* (2016.01)
*H02P 29/68* (2016.01)

(52) U.S. Cl.
CPC .................................... *H02P 29/68* (2016.02)

(58) Field of Classification Search
CPC ........ H02M 3/156; H02M 1/08; H02M 7/003; H02M 1/32; H02M 1/007; H02M 1/327; H02P 29/68; H02P 27/06
USPC .......................................................... 318/472
See application file for complete search history.

(56) References Cited

U.S. PATENT DOCUMENTS 10,700,632 B1 * 6/2020 Yoo .......................... B60L 15/20
11,101,765 B1 * 8/2021 Lehman .............. H02P 29/0241
11,368,031 B2 6/2022 Qian et al.
2011/0279074 A1 * 11/2011 Yeh ........................ G01K 13/08
318/473
2011/0285342 A1 * 11/2011 Campbell ............... H02P 21/16
318/798
2019/0067160 A1 * 2/2019 Xu .......................... H01L 25/18
2020/0031233 A1 * 1/2020 Campbell ............... B60L 3/003
2020/0099286 A1 * 3/2020 Maeda .................. H02M 3/156
2021/0313924 A1 * 10/2021 Yoo ..................... H02M 1/0009
2022/0097530 A1 * 3/2022 Gagas ..................... H02P 29/68
2022/0126701 A1 * 4/2022 Gagas ..................... B60L 53/24
(Continued)

OTHER PUBLICATIONS

Andresen et al., "Junction Temperature Control for More Reliable Power Electronics", Jan. 2012, p. 765, vol. 33, No. 1, IEEE Transactions on Power Electronics.
(Continued)

*Primary Examiner* — Gabriel Agared
(74) *Attorney, Agent, or Firm* — David B. Kelley; Brooks Kushman P.C.

(57) ABSTRACT

An electric drive system includes a power electronics module with a DC-DC converter and an inverter. The power electronics modules include a plurality of Silicon Carbide switches. Dynamic models are used to estimate the temperatures of the switch junctions and of the Direct Bond Copper substrate. The dynamic models rely on a coolant flowrate value from a coolant system. If the estimate of the substrate temperature differs substantially from a measured substrate temperature, a controller concludes that the coolant system is not delivering the stated flow rate of coolant and takes remedial action such as reducing motor torque to zero.

20 Claims, 4 Drawing Sheets

(56) References Cited

U.S. PATENT DOCUMENTS

| | | | | |
|---|---|---|---|---|
| 2023/0411459 | A1* | 12/2023 | Harel | H10D 62/405 |
| 2024/0072717 | A1* | 2/2024 | Nagarale | H02P 29/68 |

OTHER PUBLICATIONS

Gachovska et al., "A Real-Time Thermal Model for Monitoring of Power Semiconductor Devices", DOI 10.1109/TIA.2015.2391438, IEE Transactions on Industry Applications.

* cited by examiner $T_{j\_est}$
$V_{dc}$
$I_{d,q}$
$V_{d,q}$
$f_{sw}$
$OP_{mode}$
Power Device Loss Computation
90
$P_{loss}$
Temperature Estimation
96
$T_{j\_est}$
$T_{dbc\_est}$
Resistances, Capacitances
Power Electronics Protection
98
Coolant System
94
$T_{coolant}$
flowrate
Thermal Model Parameter Generation
92
$T_{dbc_meas}$
Substrate Temperature Sensor
100

MOTOR CONTROL BASED ON POWER ELECTRONICS TEMPERATURES

TECHNICAL FIELD

The present disclosure relates to use of a dynamic models to estimate a temperature of an inverter switch junction and to control a motor accordingly. More particularly, the disclosure pertains to detecting and responding to an inverter coolant loop fault.

BACKGROUND

An electric drive system includes a battery, a power electronics module, and a motor. During operation, the switches in the power electronics module are rapidly switching to control AC current in stator windings of the motor such that the motor produces a controlled torque. Some heat is generated within the switches which must be dissipated. Liquid coolant may be directed past a substrate of the power electronics module to help dissipate the heat.

SUMMARY

An electric drive system includes an inverter, a coolant system, a temperature sensor, and a controller. The inverter has at least one switch with a substrate and a junction. The switch may be a Silicon Carbide switch which may not include a temperature sensor. The substrate may be direct bond copper. The coolant system is configured to provide a flow of coolant to the substrate and to output a coolant flow rate value. The temperature sensor is mounted on the substrate. The controller programmed to control the at least one switch to adjust a motor torque. The controller is further programmed to reduce the motor torque in response to a temperature measurement from the temperature sensor differing from an estimate of a temperature of the substrate by a difference threshold. In some embodiments, the torque may be reduced to zero in this circumstance. The estimate of the temperature of the substrate is output by a dynamic model having the coolant flow rate value as an input. The dynamic model may also output an estimate of a temperature of the junction. The torque may be reduced when any of the estimated junction temperature, estimated substrate temperature, or measured substrate temperature exceed a temperature threshold.

An electric drive system includes a controller implementing a power device loss computation module, a temperature estimation module, and a power electronics protection module. The power device loss computation module is programmed to estimate a power dissipation rate of a switch on a substrate in a power electronics module. The temperature estimation module is programmed to estimate a temperature of the substrate based on the estimated power dissipation rate, a coolant temperature, and a coolant flow rate value provided by a coolant system. The temperature estimation module is further programmed to estimate a temperature of a junction of the switch in the power electronics module. The power electronics protection module is programmed to reduce a motor torque in response to the estimated temperature of the substrate differing from a substrate temperature measurement by a difference threshold. The motor torque may be reduced to zero. The power electronics protection module may be further programmed to reduce the motor torque in response to the substrate temperature measurement, the estimated temperature of the substrate, or the estimated temperature of the junction exceeding a threshold.

The controller may also include a thermal model parameter generation module programmed to adjust parameters used by the temperature estimation module based on the flow rate value and the coolant temperature.

A method includes controlling switches to adjust a motor torque, cooling an inverter, and reducing the motor torque to protect an inverter in the event of a cooling anomaly. A substrate of the inverter is cooled using a coolant. A temperature of the substrate is measured. The temperature of the substrate is also output by a dynamic model having a flow rate of the coolant as an input. The motor torque is reduced in response to the measured temperature exceeding the estimated temperature of the substrate by more than a difference threshold. The motor torque may also be reduced in response to the estimated temperature of the substrate, the measured temperature of the substrate, or an estimated temperature of a switch junction exceeding a threshold.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
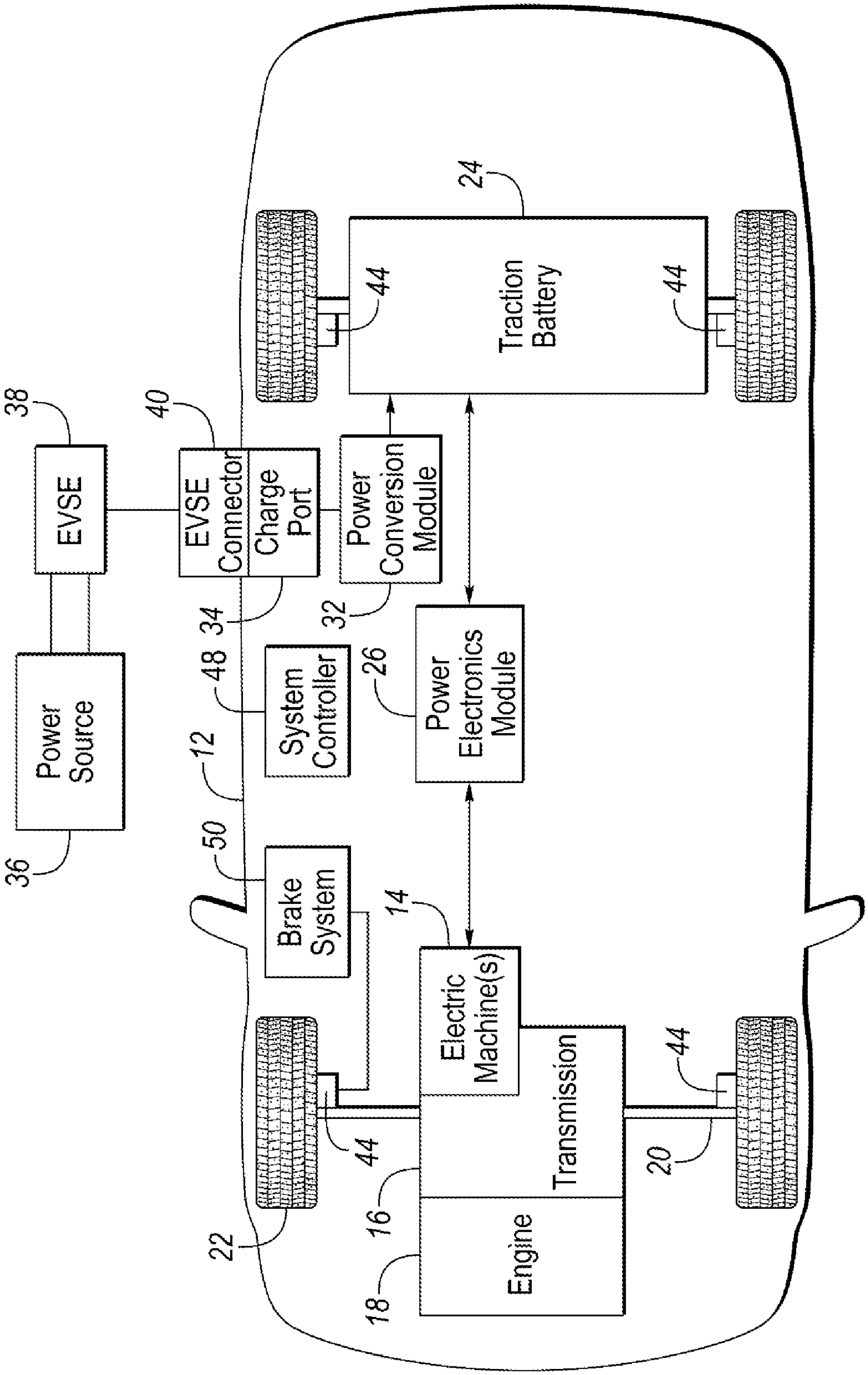
FIG. 1 illustrates a block diagram of an electric vehicle.

Referring now to FIG. 1, a block diagram of an exemplary electric vehicle ("EV") 12 is shown. In this example, EV 12 is a plug-in hybrid electric vehicle (PHEV). EV 12 includes one or more electric machines 14 ("e-machines") mechanically connected to a transmission 16. Electric machine 14 is capable of operating as a motor and as a generator. Transmission 16 is mechanically connected to an engine 18 and to a drive shaft 20 mechanically connected to wheels 22. Electric machine 14 can provide propulsion and slowing capability while engine 18 is turned on or off. Electric machine 14 acting as a generator can recover energy that may normally be lost as heat in a friction braking system. Electric machine 14 may reduce vehicle emissions by allowing engine 18 to operate at more efficient speeds and allowing EV 12 to be operated in electric mode with engine 18 off under certain conditions.

A traction battery 24 ("battery) stores energy that can be used by electric machine 14 for propelling EV 12. Battery 24 typically provides a high-voltage (HV) direct current (DC) output. Battery 24 is electrically connected to a power electronics module 26. Power electronics module 26 is electrically connected to electric machine 14 and provides the ability to bi-directionally transfer energy between battery 24 and the electric machine 14. For example, battery 24 may provide a DC voltage while electric machine 14 may require a three-phase alternating current (AC) voltage to function. Power electronics module 26 may convert the DC voltage to a three-phase AC voltage to operate electric machine 14. In a regenerative mode, power electronics module 26 may convert three-phase AC voltage from electric machine 14 acting as a generator to DC voltage compatible with battery 24.

Battery 24 is rechargeable by an external power source 36 (e.g., the grid). Electric vehicle supply equipment (EVSE) 38 is connected to external power source 36. EVSE 38 provides circuitry and controls to control and manage the transfer of energy between external power source 36 and EV 12. External power source 36 may provide DC or AC electric power to EVSE 38. EVSE 38 may have a charge connector 40 for plugging into a charge port 34 of EV 12. Charge port 34 may be any type of port configured to transfer power from EVSE 38 to EV 12. A power conversion module 32 of EV 12 may condition power supplied from EVSE 38 to provide the proper voltage and current levels to battery 24. Power conversion module 32 may interface with EVSE 38 to coordinate the delivery of power to battery 24. Alternatively, various components described as being electrically connected may transfer power using a wireless inductive coupling.

Wheel brakes 44 are provided for slowing and preventing motion of EV 12. Wheel brakes 44 are part of a brake system 50. Brake system 50 may include a controller to monitor and control wheel brakes 44 to achieve desired operation.

The various components discussed may have one or more associated controllers to control and monitor the operation of the components. The controllers can be microprocessor-based devices. The controllers may communicate via a serial bus (e.g., Controller Area Network (CAN)) or via discrete conductors. For example, a system controller 48 (i.e., a vehicle controller) is present to coordinate the operation of the various components.

As described, EV 12 is in this example is a PHEV having engine 18 and battery 24. In other embodiments, EV 12 is a battery electric vehicle (BEV). In a BEV configuration, EV 12 does not include an engine.

Figure 2:
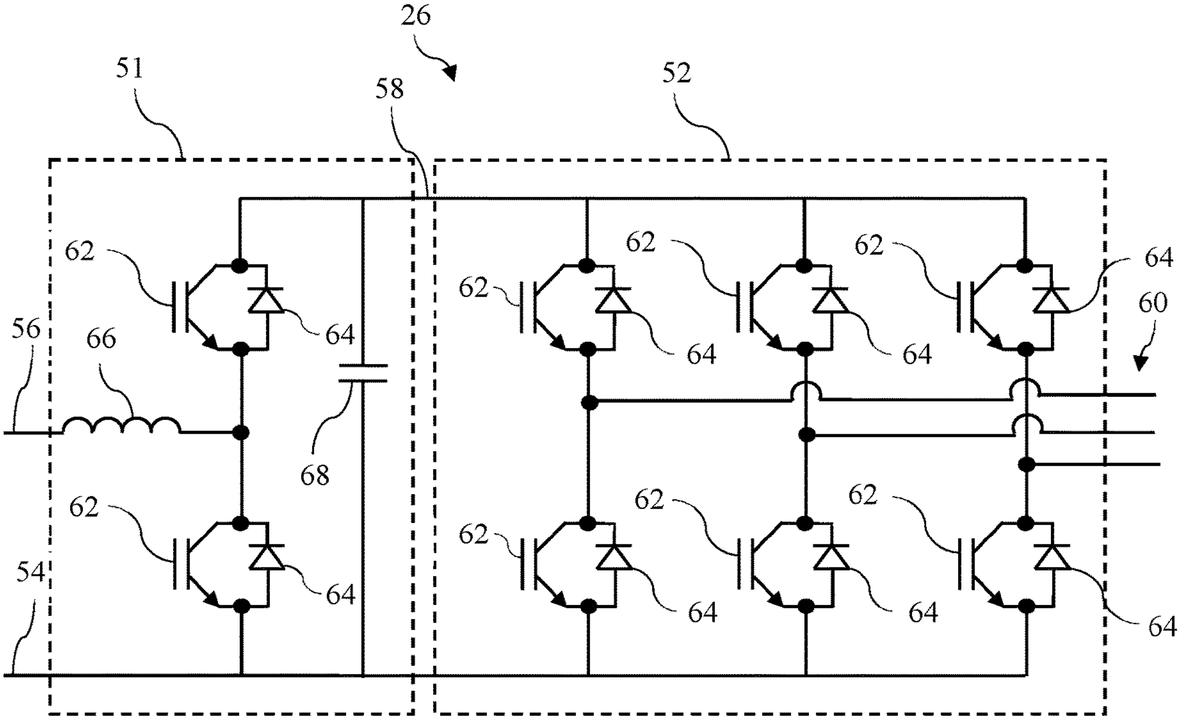
FIG. 2 is a circuit diagram of a power electronics module of the electric vehicle of FIG. 1.

Referring now to FIG. 2, a schematic diagram of components of power electronics module 26 in an electric drive system of EV 12 is shown. As described above, power electronics module 26 is coupled between battery 24 and motor 14. Power electronics module 26 converts DC electrical power provided from battery 24 into AC electrical power for providing to motor 14. In this way, power electronics module 26 drives motor 14 with power from battery 24 for the motor to propel EV 12. During regenerative braking, power electronics module 26 converts the AC power induced within motor 14 to DC power to charge battery 24.

Power electronics module 26 includes a DC-DC converter 51 and an inverter 52. As known to those of ordinary skill, inverters convert DC power to multi-phase AC power (three-phase being most common). DC-DC converters can boost (increase) or buck (decrease) the DC voltage available to the inverter from what is available from the battery. DC power from the battery is delivered on a negative terminal 54 and a positive terminal 56. DC power from the converter 51 is delivered to inverter 52 by negative terminal 54 and positive terminal 58. Some embodiments may omit the DC-DC converter 51, in which case positive terminal 58 would be connected to the positive terminal of the battery. Inverter 52 delivers AC power to the motor via AC terminals 60.

Converter 51 and inverter 52 include a plurality of power switch units. Each power switch unit includes a power switch 62 arranged anti-parallel with a diode 64. Converter 51 also includes an inductor 66 and a capacitor 68. The rapid switching results in some degree of power loss, $P_{loss}$, which is dissipated as heat. As a result, in some instances, the temperature of a junction of the switch can exceed a limit unless corrective action is taken. The switches 62 may be Silicon Carbide (SiC) switches. Unlike Insulated Gate Bipolar Transistors (IGBTs), SiC switches do not typically include a provision to directly measure junction temperature.

Figure 3:
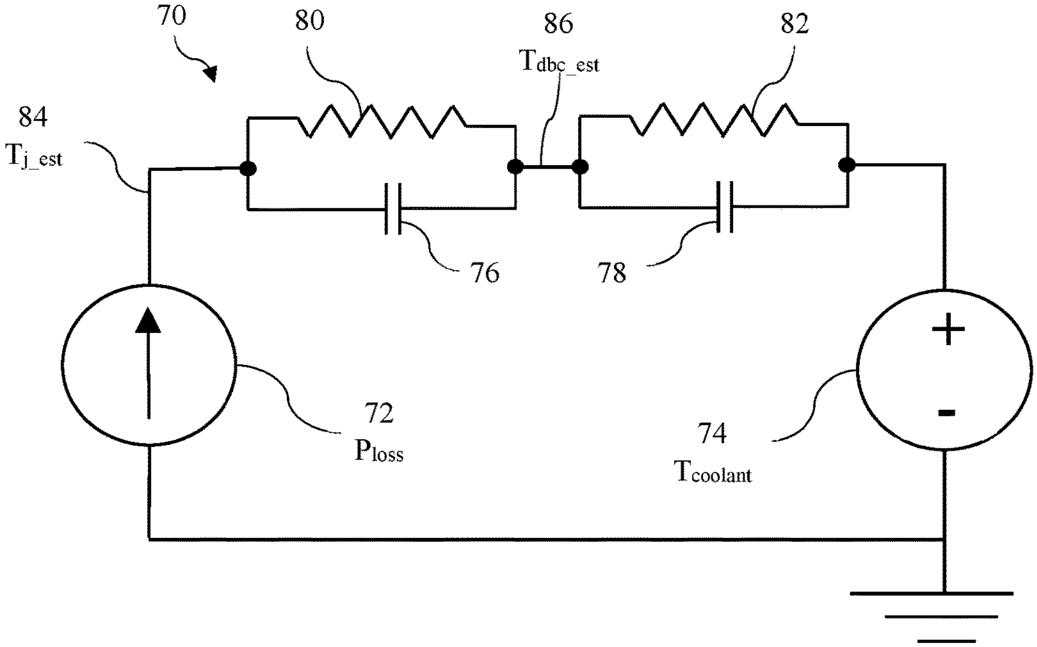
FIG. 3 is a circuit diagram for an equivalent circuit of a dynamic temperature model.

FIG. 3 illustrates a dynamic model for predicting the junction temperature $T_{j\_est}$ of a switch and also a temperature $T_{dbc\_est}$ of a Direct Bond Copper (DBC) substrate. The model is illustrated in the form of an equivalent electrical circuit. Current source 72 represents the power loss of a power switch unit. Voltage source 74 represents the temperature of a coolant. Thermal capacitances 76 and 78 and thermal resistances 80 and 82 are lumped parameters characterizing heat flow from the junction, through the substrate, and into the coolant. These parameters are functions of the coolant temperature and the coolant flow rate. The voltage at location 84 indicates the temperature estimate of the junction $T_{j\_est}$. The voltage at location 86 represents the temperature of the substrate $T_{dbc\_est}$.

Figure 4:
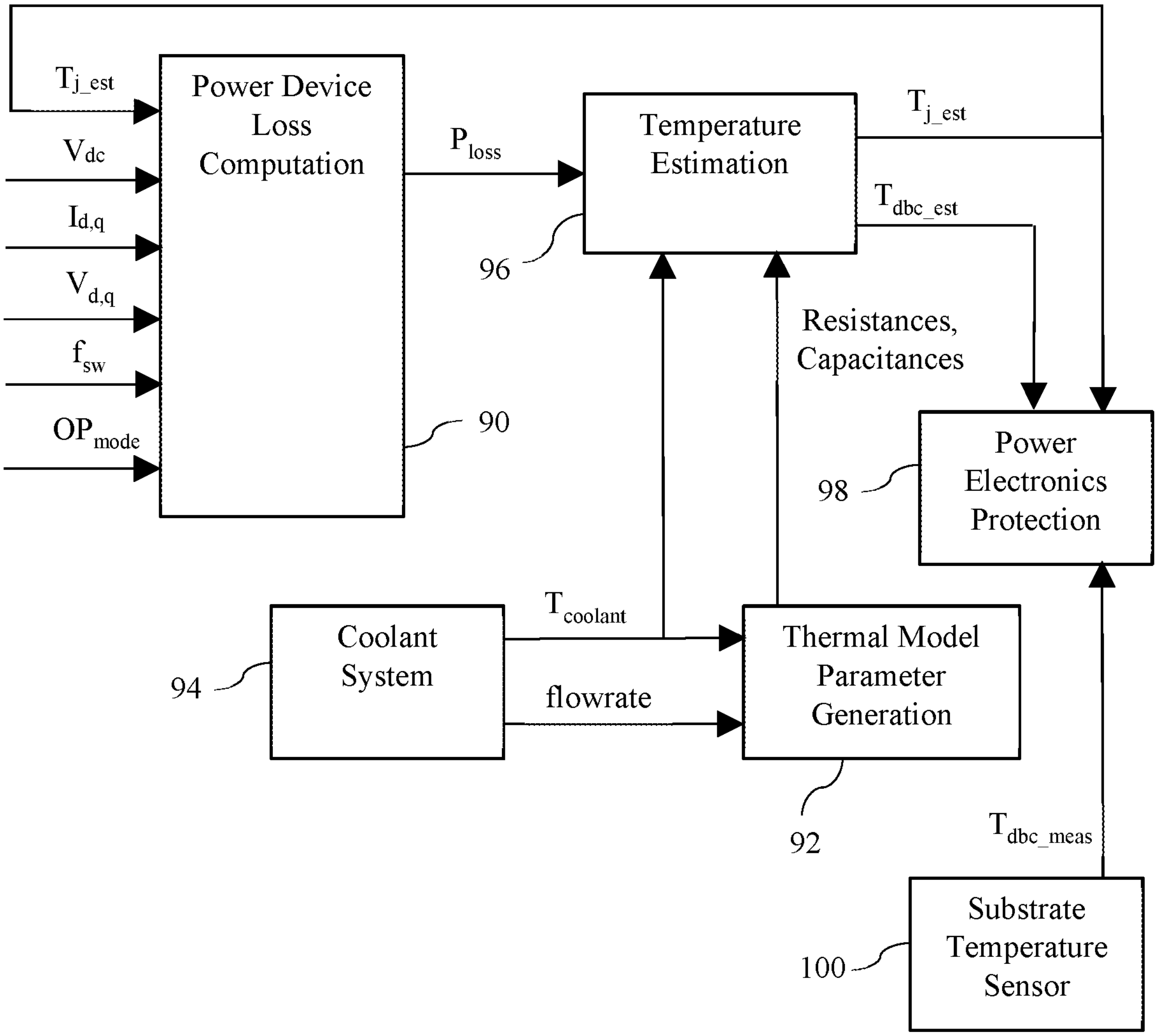
FIG. 4 is a control diagram for a controller associated with the power electronics module of FIG. 2.

FIG. 4 is a block diagram of the power device temperature estimation and protection strategy. Power loss computation module estimates the power loss at a switch junction, $P_{loss}$. The power loss at the junction indicates a rate at which heat must be dissipated. Thermal model parameter generation module computes the thermal resistances and capacitances 76-82 of FIG. 3 based on coolant temperature and flowrate as reported by coolant system 94. Temperature estimation module 96 updates the estimated temperature using known dynamic simulation techniques based on the equivalent circuit of FIG. 3. Power electronics protection module 98 responds to the estimated temperatures and a measured temperature from a sensor 100 by adjusting motor torque and power as described below. These modules may be part of the power electronics module 26, part of system controller 48, part of another controller, or some combination of the above.

The power device temperature estimation algorithm uses a Kalman filter observer based on the model of FIG. 3. The discrete time varying model may be written as:

$$x(k+1) = A(k)x(k) + B(k)u(k) + W(k)$$

$$y(k) = C(k)x(k) + D(k)u(k) + V(k)$$

where $$A(k) = \begin{bmatrix} 1 - \frac{T_s}{\tau_1} & 0 & 0 \\ 0 & 1 - \frac{T_s}{\tau_2} & 0 \\ -\frac{1}{\tau_1} & -\frac{1}{\tau_2} & 1 \end{bmatrix},$$

$$B(k) = \begin{bmatrix} \frac{T_s}{C_1} \\ \frac{T_s}{C_2} \\ \frac{(C_1 + C_2)T_s}{(C_1 C_2)} \end{bmatrix},$$

Figure 5:
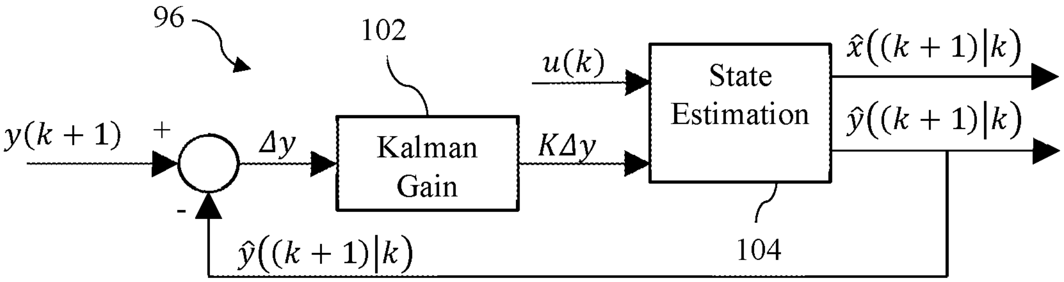
FIG. 5 is a control diagram for the temperature prediction module of FIG. 4 based on the equivalent circuit of FIG. 3.

-continued $$C(k) = [-1 \quad -1 \quad 1],$$

$$x(k) = \begin{bmatrix} x_1(k) \\ x_2(k) \\ T_j(k) \end{bmatrix},$$

$$u(k) = [P_L(k)],$$

$$y(k) = [T_{cool}]$$

is the coolant temperature, and W(k) and V(k) are the system and measurement noises respectively. The observer algorithm is illustrated in FIG. 5. At 102, Kalman gains are updated using the equations:

$$P(k+1\,|\,k) = A(k)P(k\,|\,k)A^T(k) + Q(k),$$

$$K(k+1) = P(k+1\,|\,k)C^T(k+1)\{C(k+1)P(k+1\,|\,k)C^T(k+1) + R(k+1)\}^{-1},$$

and $$P(k+1\,|\,k+1) = P(k+1\,|\,k) - K(k+1)H(k+1)P(k+1\,|\,k).$$

At 104, the states are estimated using the equations:

$$\hat{x}(k+1\,|\,k) = A(k)\hat{x}(k\,|\,k) + B(k)u(k)$$

and $$\hat{x}(k+1\,|\,k+1) = \hat{x}(k+1\,|\,k) + K(k+1)\{y(k+1) - \hat{y}(k+1\,|\,k)\}.$$

K is the Kalman gain matrix. The notation (k+1|k) denotes prediction at time k+1 based on data up to and including time k.

Figure 6:
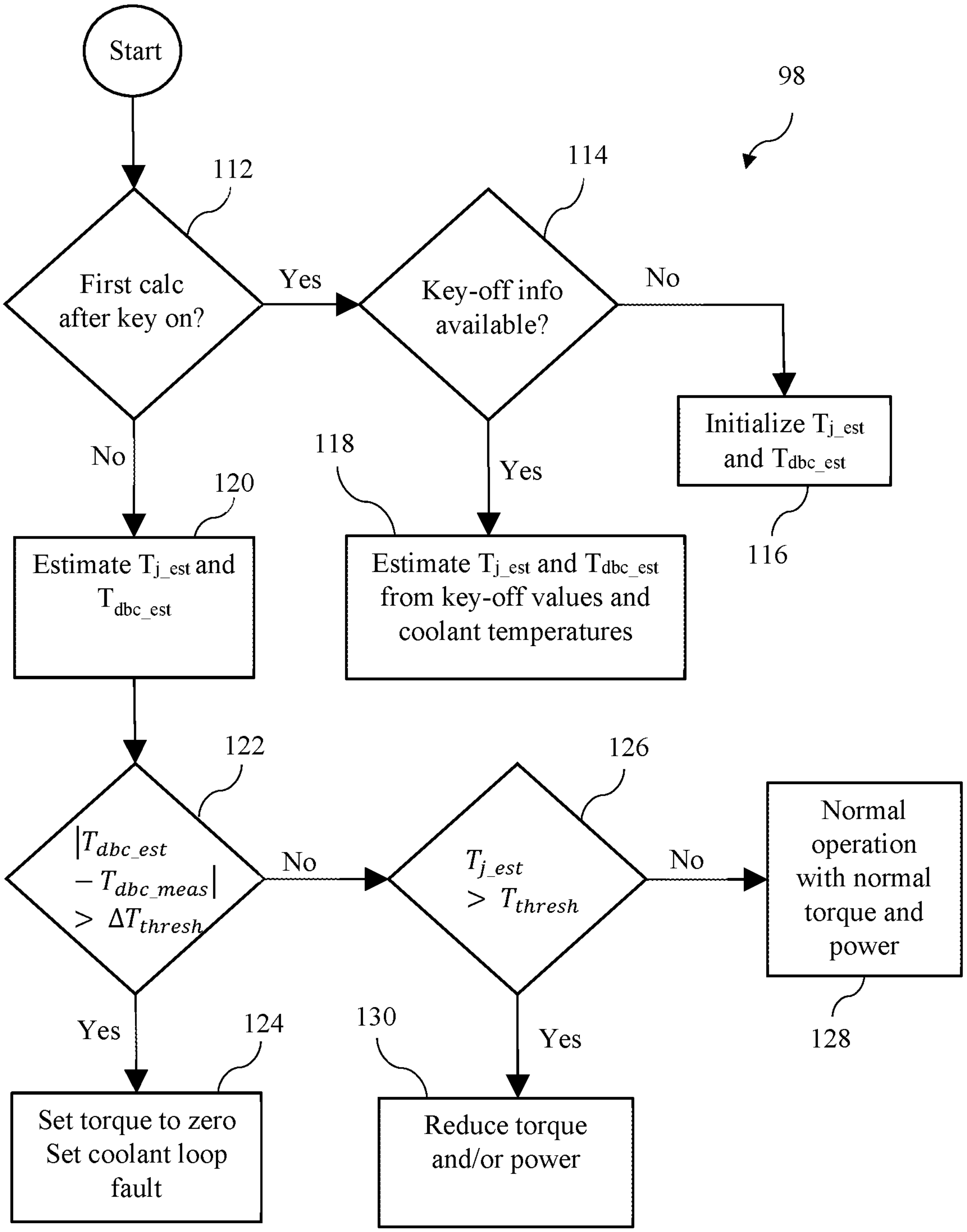
FIG. 6 is a flow chart of a method executed by one of the modules in the control diagram of FIG. 4.

FIG. 6 illustrates a control algorithm executed within power electronics protection module 98 at regular intervals whenever the key is on. For example, the algorithm may be executed every 100 ms in response to an interrupt signal. At 112, the controller checks whether this is the first calculation since turning the key on. If so, then the controller checks at 114 whether information was saved from the most recent key-off event. If not, then the controller initializes $T_{j\_est}$, the estimated junction temperature, and $T_{dbc\_est}$, the estimated substrate temperature, to default values at 116. If key-off information is available at 114, then, at 118, the controller calculates $T_{j\_est}$ and $T_{dbc\_est}$ from the values and the coolant temperature as recorded at the time the key was turned off. Specifically, based on how much time has passed since the key-off event, the controller estimates how much the junction would have cooled down. If this is not the first calculation since key-on, then the controller uses the dynamic model based on the equivalent circuit of FIG. 3 to calculate $T_{j\_est}$ and $T_{dbc\_est}$ at 120.

As shown in FIG. 4, information about the coolant flow rate and the coolant temperature is provided by coolant system 94. In rare circumstances, abnormalities of parts of the coolant system, such as a fitting becoming disconnected, could result in the actual flow rate being substantially reduced. Although the coolant system would eventually detect this type of issue and report the lower flow rate, the time delay in reporting the issue may be too long to effectively prevent overheating at the switch junction. To mitigate this scenario, the controller includes features to detect and respond to a coolant flowrate less than reported. Although it may be impractical to directly measure the junction temperature of the SiC switch, a temperature sensor may be included to measure the temperature of the DBC substrate. If the actual flow rate is less than reported by coolant system 94, the measured temperature of the substrate, $T_{dbc_meas}$, will increase to a level higher than predicted by the dynamic model. At 122, the controller compares the difference between the estimated temperature and the measured temperature to a threshold difference $\Delta T_{thresh}$. The difference threshold is set high enough to account for normal variations associated with the sensor and the dynamic model, but low enough that a substantial flow rate difference is sensed soon enough to take protective action. If the difference exceeds the threshold at 122, the controller sets the motor torque to zero at 124. In other embodiments, the motor torque may be reduced progressively in proportion to the difference or in proportion to the measured substrate temperature.

At 126, the estimated temperature of the junction, $T_{j\_est}$, is compared to a temperature threshold. If the estimated temperature does not exceed the temperature threshold, then the protective drive system continues with normal operation at 128 generating the torque commanded by the controller based on other criteria. If the estimated junction temperature exceeds the threshold at 126, then the torque and/or the power is reduced at 130 from the level that the controller would have otherwise selected. The amount of reduction may be proportional to the difference between the estimated junction temperature and the temperature threshold, such that the limits are not zero unless the estimated junction temperature exceeds the temperature threshold by a predefined amount.

As shown in FIG. 2, power electronics module 26 includes a plurality of switches 62. The controller may calculate a separate power loss, junction temperature estimate, and substrate temperature estimate for each one. The remedial actions at 124 and 130 may be taken in response to any one of the temperature estimates. The remedial action for the switches in the DC-DC converter 51 may differ from the remedial action for the switches in the inverter 52. For example, the boosted DC voltage may be reduced.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric drive system, comprising:
an inverter having at least one switch with a substrate;
a coolant system configured to provide a flow of coolant to the substrate and to output a coolant flow rate value;
a temperature sensor mounted on the substrate; and
a controller programmed to control the at least one switch to adjust a motor torque, the controller further programmed to reduce the motor torque in response to a temperature measurement from the temperature sensor differing from an estimate of a temperature of the substrate by a difference threshold, wherein the estimate of the temperature of the substrate is output by a dynamic model having the coolant flow rate value as an input.

2. The electric drive system of claim 1, wherein the controller is programmed to reduce the motor torque to zero in response to the temperature measurement from the temperature sensor differing from the estimate of the temperature of the substrate by the difference threshold.

3. The electric drive system of claim 1, wherein:
the at least one switch has a junction;
the dynamic model is further configured to estimate a temperature of the junction; and
the controller is further programmed to reduce the motor torque in response to the estimate of the temperature of the junction exceeding a junction temperature threshold.

4. The electric drive system of claim 1, wherein the controller is further programmed to reduce the motor torque in response to the estimate of the temperature of the substrate exceeding a substrate temperature threshold.

5. The electric drive system of claim 1, wherein the controller is further programmed to reduce the motor torque in response to the temperature measurement exceeding a substrate temperature threshold.

6. The electric drive system of claim 1, wherein the at least one switch is a Silicon Carbide switch.

7. The electric drive system of claim 6, wherein the Silicon Carbide switch does not include a temperature sensor.

8. The electric drive system of claim 1, wherein the substrate is a direct bond copper substrate.

9. An electric drive system comprising:
a controller implementing:
a power device loss computation module programmed to estimate a power dissipation rate of a switch on a substrate in a power electronics module;
a temperature estimation module programmed to estimate a temperature of the substrate based on the estimated power dissipation rate, a coolant temperature, and a coolant flow rate value provided by a coolant system; and
a power electronics protection module programmed to reduce a motor torque in response to the estimated temperature of the substrate differing from a substrate temperature measurement by a difference threshold.

10. The electric drive system of claim 9, wherein the power electronics protection module is further programmed to reduce the motor torque to zero in response to the substrate temperature measurement differing from the estimated temperature of the substrate by the difference threshold.

11. The electric drive system of claim 9, wherein:
the temperature estimation module is further programmed to estimate a temperature of a junction of the switch in the power electronics module; and
the power electronics protection module is further programmed to reduce the motor torque in response to the estimate of the temperature of the junction exceeding a junction temperature threshold.

12. The electric drive system of claim 9, wherein the power electronics protection module is further programmed to reduce the motor torque in response to the estimated temperature of the substrate exceeding a substrate temperature threshold.

13. The electric drive system of claim 9, wherein the power electronics protection module is further programmed to reduce the motor torque in response to the substrate temperature measurement exceeding a substrate temperature threshold.

14. The electric drive system of claim 9, wherein the controller further comprises a thermal model parameter generation module programmed to adjust parameters used by the temperature estimation module based on the flow rate value and the coolant temperature.

15. A method, comprising:
controlling switches in an inverter to adjust a motor torque;
cooling a substrate of the inverter with a coolant;
measuring a temperature of the substrate of the inverter; and
reducing the motor torque in response to the measured temperature exceeding an estimated temperature of the substrate by more than a difference threshold, wherein the estimated temperature of the substrate is output by a dynamic model having a flow rate of the coolant as an input.

16. The method of claim 15, wherein the motor torque is reduced to zero in response to the measured temperature exceeding the estimated temperature of the substrate by more than the difference threshold.

17. The method of claim 15, further comprising reducing the motor torque in response to an estimated temperature of a switch junction exceeding a temperature threshold, wherein the estimated temperature of the switch junction is output by the dynamic model.

18. The method of claim 15, further comprising reducing the motor torque in response to the estimated temperature of the substrate exceeding a temperature threshold.

19. The method of claim 15, further comprising reducing the motor torque in response to the measured temperature exceeding a temperature threshold.

20. The electric drive system of claim 1, wherein the temperature measurement from the temperature sensor is not an input of the dynamic model.

* * * * *